United States Patent Office

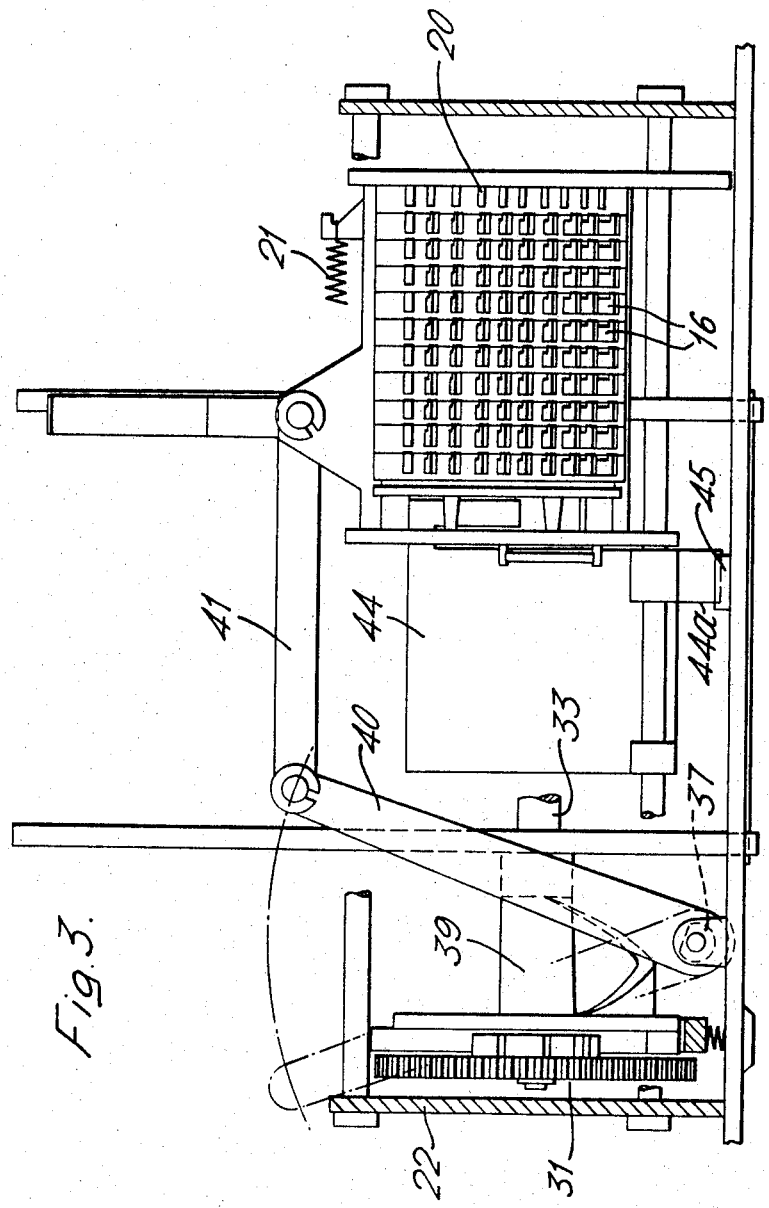

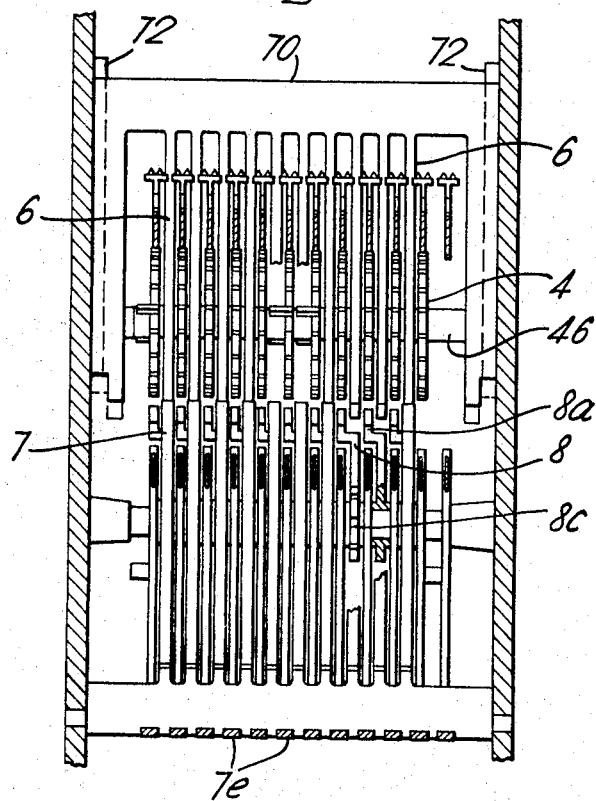

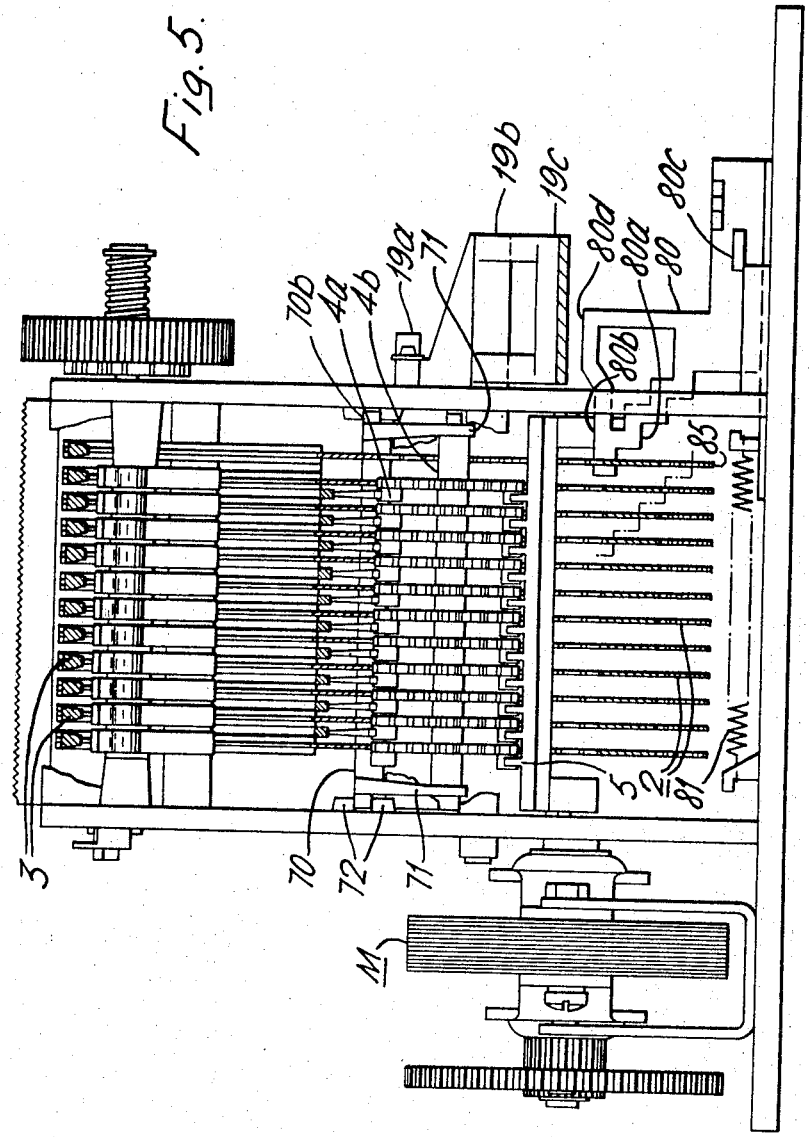

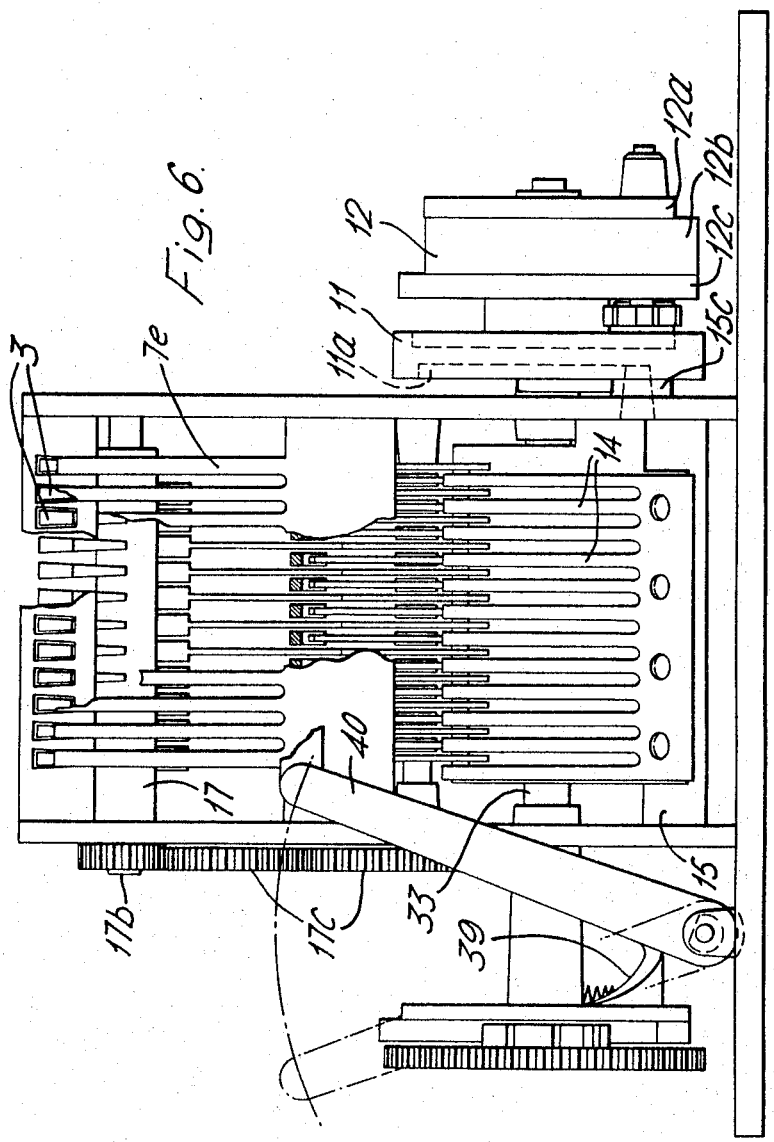

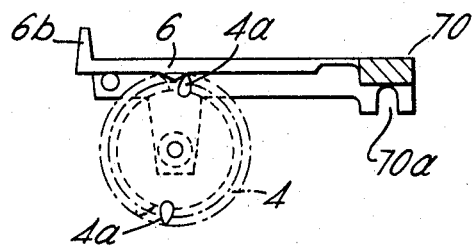
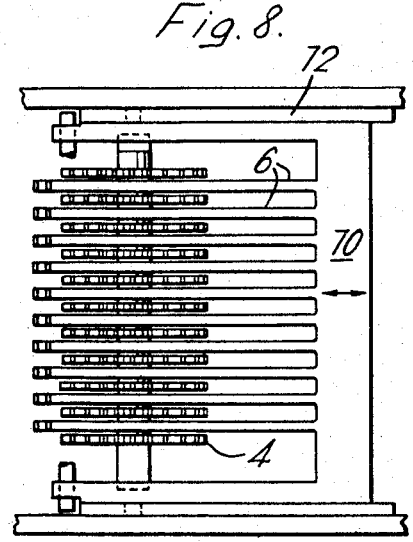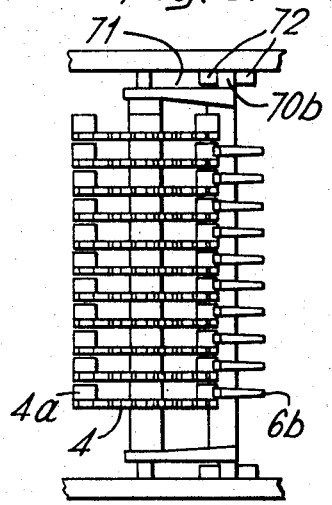
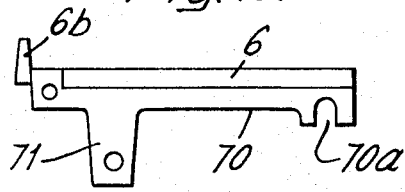

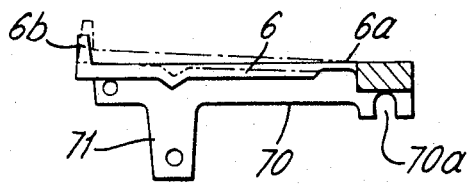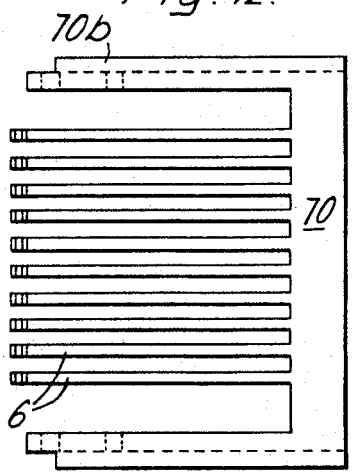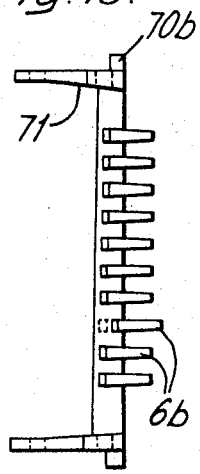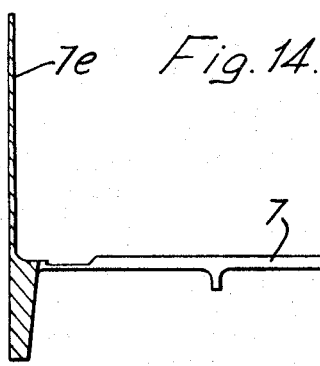

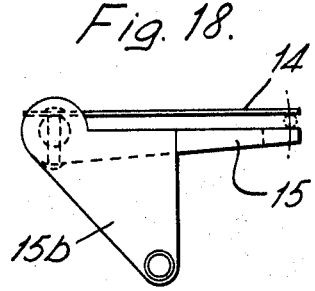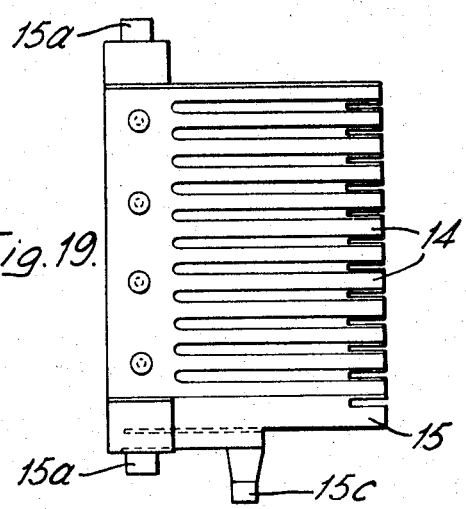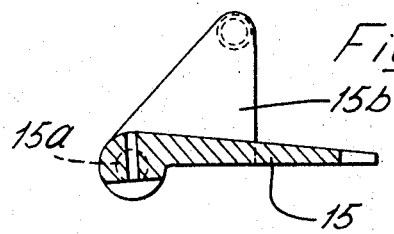

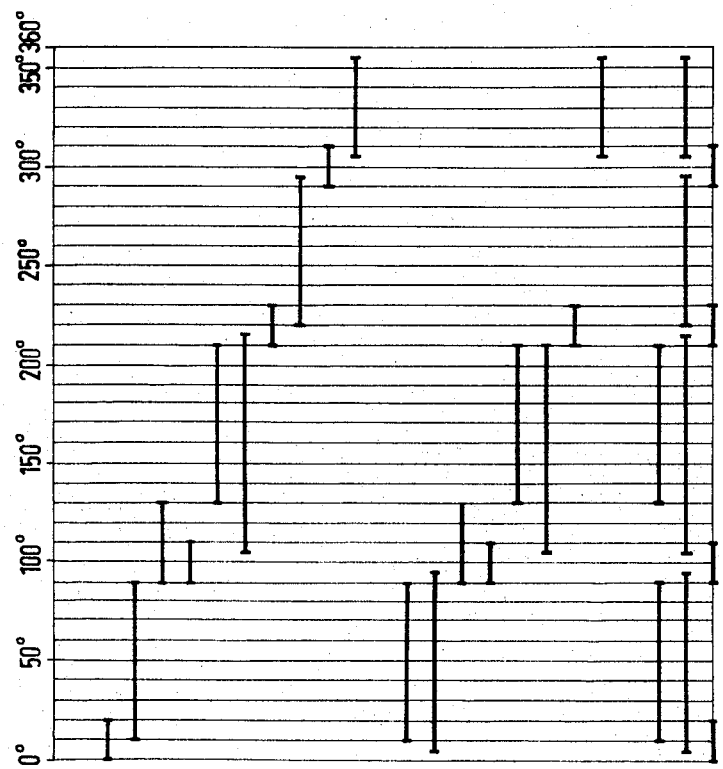

3,419,212
Patented Dec. 31, 1968

3,419,212
CALCULATING MECHANISMS FOR
CALCULATING MACHINES
Tibor Arvai, Paris, France, assignor to Sperry Rand Corporation, New York, N.Y., a corporation of Delaware
Filed Mar. 27, 1967, Ser. No. 626,284
Claims priority, application France, Mar. 28, 1966
55,722
16 Claims. (Cl. 235—60)

ABSTRACT OF THE DISCLOSURE

A calculating machine of the ten key type is provided in which a pin carriage upon receiving data from the keyboard progressively escapes. Data reading sectors are provided to read the data and transfer same to an accumulator. A carry storage mechanism is provided mounted on the same shaft as the data reading sectors. A cam shaft is arranged to be rotated by drive means and cams thereon are effective to cycle the accumulator for motion in a linear path between the data reading sectors and the carry storage mechanism. Reading of data and transfer of carries are effected by actuating means comprising integrally formed leaf springs cut in the form of a comb and rocked from the main cam shaft. Carries are read from the accumulator and transferred to the carry storage mechanism by similar integrally formed leaf spring cut in the form of a comb.

Cross-references to related applications

The invention disclosed in the present application may be conveniently employed in conjunction with the keyboard and data entry mechanism disclosed in commonly assigned U.S. Patent No. 3,385,519 filed Jan. 23, 1967, and entitled, "Improvements in Calculating Machines." Also reference may be made to an application filed Feb. 28, 1967, under No. 619,376 and entitled "Printing Mechanisms Mainly for Adding Machines."

Background of the invention

The present invention relates to a mechanical calculating machine of the ten key type. Such calculating machines are well known and well represented in the prior art. Machines have been previously proposed capable of performing additions alone; additions and subtractions; additions, subtractions and multiplications; and additions, subtractions, multiplications and divisions. Various additional features may be found in the many machines currently available.

All such machines tend to be extremely complicated and as the number of automatic operations provided increases, the complications likewise increase in view of the necessity to provide for various contingencies which may arise in carrying out such operations.

The present invention provides a machine basically capable of adding and subtracting, but which through use of a repeat key may be further employed to perform multiplications. A drastic simplification has been achieved with regard to machines of like capability known in the prior art. For example, U.S. Patent No. 2,667,304 illustrates a machine having basically the same capability, but which requires the use of hundreds of additional parts. As in this prior art machine, the present machine is adapted to be motor driven and to print out its results. Even a superficial comparison of the drawings in the two instances will lead to an appreciation of the extent to which simplification has been achieved.

One of the features of the present invention is that the design enables virtually all parts to be moulded or otherwise formed from a plastic material. The only requirements for non-plastic materials are for a few fastening clips, coil springs and the electrical parts. Very few complex linkages are employed with the result that the machine of the present invention is not only subject to fewer potential breakdowns, but is substantially easier to understand and hence to service when and if necessary. It is quite plain that the very considerable reduction of parts will result in a substantial lowering of the manufacturing cost.

Summary of the invention

A calculating mechanism is provided comprising first means for entering and temporarily storing data, second means for reading the data temporarily stored, an accumulator, a tens transfer storage means, cam shaft operated means for linearly shifting the accumulator between the data reading means and the tens transfer storage means according to a predetermined program and cam actuated leaf spring means cut in the form of a comb for actuating the data reading means and the tens transfer storage means at appropriate times in a cycle of operations. Additional leaf springs cut in the form of a comb are provided to record the passage of zeros in the accumulator and to transfer such information to the tens transfer storage means. A printing mechanism is provided which is released by a secondary cam and which has individual print hammers urged in the printing direction by means of an integrally formed leaf spring cut in the form of a comb. In connection with the printing mechanism non significant zero suppression locks act on the individual print hammers and a shutter mechanism operates in conjunction with the data entry means to prevent cycling of the data reading means ahead of the most significant entered digit.

Brief description of the drawings

FIGURE 3 is a front sectional view of the machine with the cover removed showing pin box, shutter mechanism and carriage return cam.

FIGURE 4 is a sectional plan view of the arithmetic mechanism and illustrates details of the tens transfer mechanism.

FIGURE 5 is a front sectional view showing details of the accumulator and its carriage actuating means as well as the total taking and symbol printing cam.

FIGURE 6 is a front sectional view showing the main cam shaft, the print hammers and their springs and the actuating stirrup of the arithmetic segments.

FIGURES 7, 8 and 9 show sections and plans of the accumulator and its carriage.

FIGURES 10, 11, 12 and 13 show the accumulator carriage and the tens transfer spring.

FIGURES 14, 15, 16 and 17 show the tens transfer pawl actuating springs and print hammer actuating springs as formed in a single piece.

FIGURES 18, 19 and 20 show the assembly of the actuating stirrup for the arithmetic sectors.

FIGURE 24 is a timing diagram from which may be deduced the profiles of the several cams.

DESCRIPTION OF AN EMBODIMENT

General description

Figure 1:
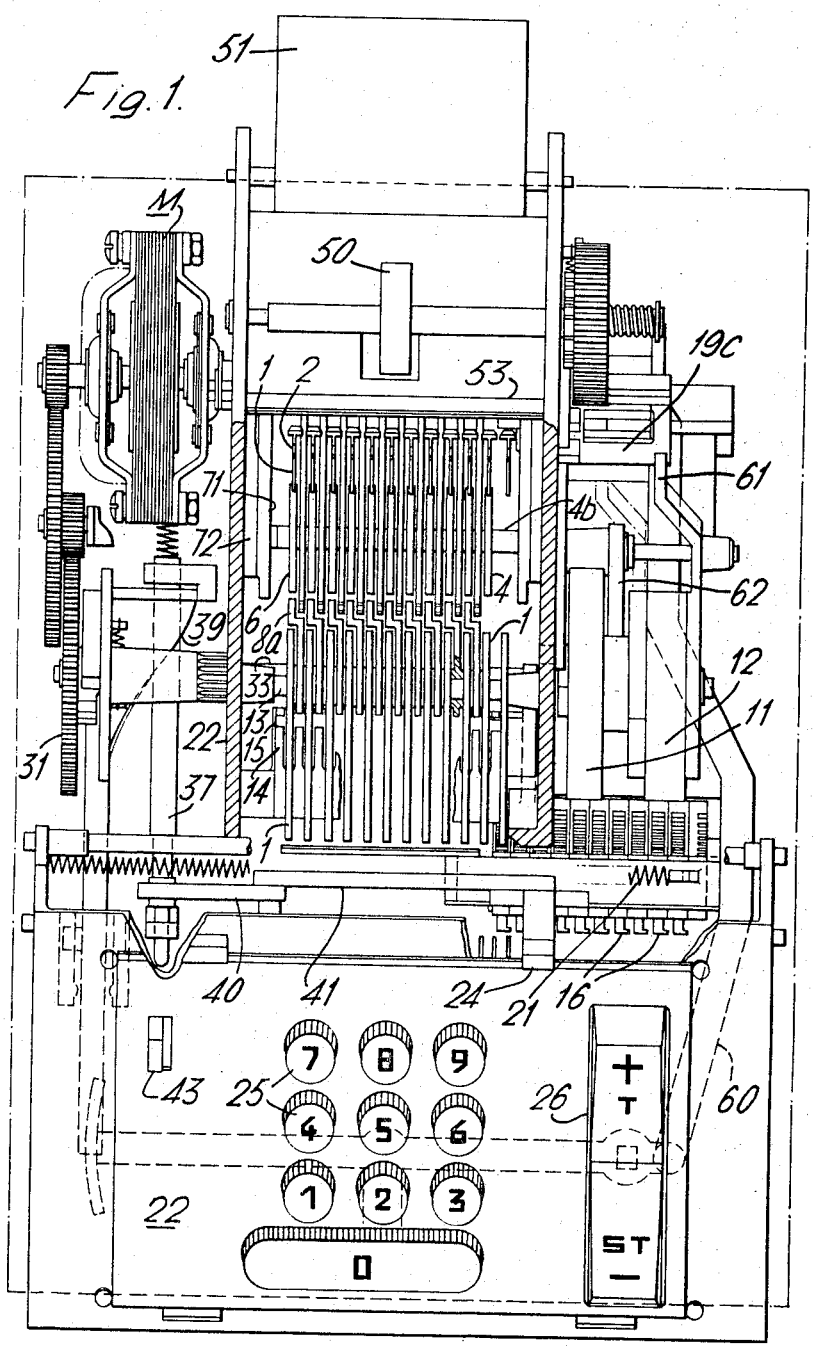
FIGURE 1 is a plan view of the entire machine with the cover removed from the calculating portion of the mechanism.
Figure 2:
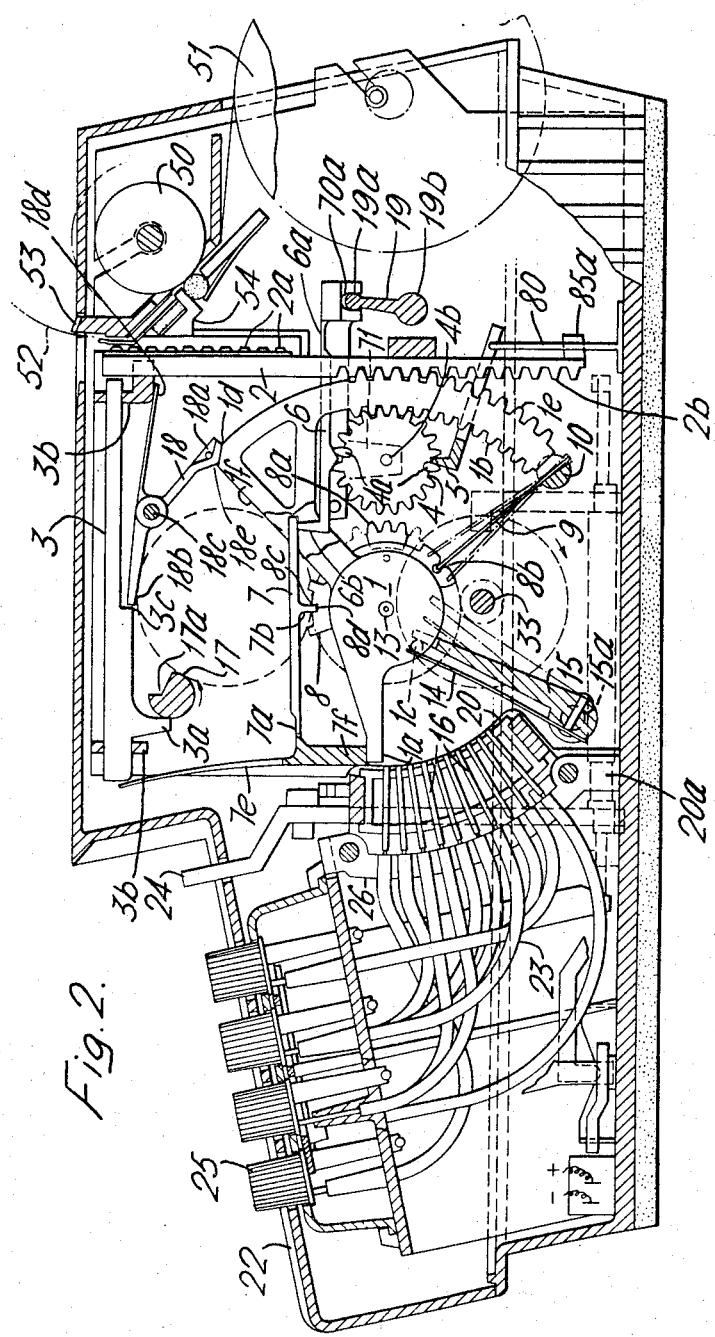
FIGURE 2 is a cross-sectional view of the entire machine as seen from the right-hand side of FIGURE 1.

Although the present invention is more particularly concerned with a mechanical movement for adding and subtracting, nevertheless for the sake of completeness and ease of understanding, brief reference will be made to all major portions of the machine, particularly as shown in FIGURES 1 and 2.

A mechanical calculator of the present type in general will comprise four main groupings of mechanisms. The first of these may consist of a data entry section which can comprise a keyboard plus mechanism for temporarily storing the digits entered from the keyboard. The second of these groups of mechanisms will comprise means for reading the numbers as entered into the keyboard, transmitting them to an accumulator and effecting the desired arithmetic operations. A third group of mechanisms may comprise a printer operated from the arithmetic mechanism which may print out the data as entered into the keyboard and eventually the results obtained following arithmetic manipulation of such data. Finally, there must be provided means for driving the machine and for providing the various operations. This means may take the form of a motor driven cam shaft together with its associated program cams.

Referring to FIGURES 1 and 2, one will observe all of these several mechanisms. The casework and various supporting frames of the machine are given the collective designation 22 as may be seen from FIGURES 1 and 2 in particular. This casework may be conveniently moulded from plastic material, with all necessary holes and bearings necessary for permitting passage of various members and providing supports for the various shafts, moulded integrally therewith. At the bottom of FIGURE 1 will be observed the keyboard. This is shown as a standard 10 key machine and on the keyboard are shown digit keys 0 to 9 identified by reference numeral 25, an action key 26 and a repeat key 43. It will be observed that a single action key is, in accordance with the present invention, sufficient to obtain additions, subtractions and results in the form of totals and sub-totals.

Data entry mechanism

The details of this data entry mechanism form the subject matter of a co-pending application by the same inventor, entitled, "Improvements in Calculating Machines" U.S. Patent No. 3,385,519. Accordingly, the present description will be limited to those details necessary for full understanding of the present invention.

Digit keys 25 are coupled to a collector 26 by means of a plurality of push rods slidable within flexible sleeves 23. Depression of a digit key 25 results in moving the corresponding push rod through its sleeve where the lower tip may abut against and displace a corresponding digit pin 16 mounted in pin box 20. Pin box 20 as shown to best advantage in FIGURES 2 and 3 in the present embodiment is shown provided with 11 columns of digit pins. By means of additional linkage, following the depression of any of the digit keys 25 the lowermost digit pin as shown in FIGURE 2 corresponding to the digit 9 will also be set. The setting of this pin enables progressive escapement of the pin carriage from one decimal column to the next until all digits are entered or until all columns are set. Details of the aforesaid mechanism may be more readily obtained from the aforementioned pending application.

During a cycle of operation as set off by the action key 26, the pins which have been set will be read and following such read operation the pin carriage will be returned to its initial position by mechanism shown in greater detail in the afore-mentioned application, but consisting basically of cam 39 mounted on the main cam shaft 33 as shown in FIGURES 1, 3 and 6 acting on levers 40 and 41 to slide the pin carriage along its mounting rails against the bias of spring 21. During the return motion of the pin carriage all set pins will be restored to their initial position by means of a cam surface not shown but which is arranged adjacent to the inner surface of the pin carriage 20 and is arranged to conform thereto in curvature. The pin carriage 20 may also be returned manually in the case where a wrong digit has been entered and noted by the operator, by means of lever 24 which projects through the casework above the digit keys as shown in FIGURES 1 and 2.

Arithmetic mechanism

Mounted to be freely and independently rotatable on shaft 13 are a plurality of arithmetic sectors 1. The sectors, as best shown in FIGURES 2, 21, 22 and 23, comprise a central portion having a nose portion 1a projecting to the left as viewed in FIGURE 2 and a supporting member 1f projecting upwardly to the right and carrying on its outer extremity a downwardly depending arcuate portion having rack teeth 1b on the inner edge thereof and rack teeth 1e on the outer edge. In the present embodiment 12 of these arithmetic sectors are shown, of which 11, corresponding in number to the columns in the pin box 20, are used in calculating. It is obvious that more or fewer may be provided corresponding in number to the columns in the pin box 20 according to individual requirements. The extra sector to the extreme right (FIGURE 1) is used to actuate a symbol printing mechanism. All sectors may be identically formed.

Formed integrally with each of these arithmetic sectors is a spur 1c projecting from one face thereof. Such spur serves to engage with operating mechanism subsequently to be described. The arithmetic sectors may conveniently be formed in one piece.

The arrangement of shaft 13 is such that the arithmetic sectors 1 will have their nose portions 1a adjacent to the pin box 20. As the pin box is progressively stepped to the left as viewed in FIGURES 1 or 3, progressively more of the plurality of arithmetic sectors will be aligned with a column of pins of which one pin has been set in addition to the escapement pin. It will be observed from FIGURE 2 that rotation of the individual arithmetic sectors 1 may progress in the counterclockwise direction until for each sector the nose portion 1a encounters a set pin in the pin box (see FIGURE 22). If not all columns of the pin box are used, i.e., a number is entered less than the full capacity of the machine, arithmetic sectors 1 to the left of the first entered digit will be prevented from moving in a counter clockwise direction by means of a shutter mechanism shown in FIGURE 3. This shutter mechanism is mounted on the lower pin carriage supporting rail so as to move with the pin carriage as it progressively steps to the left. In the extreme right hand position a cam 45 as shown in FIGURE 3 engages a follower portion 44a integral with shutter 44 thereby swivelling shutter 44 about its supporting rail to a so-called open position. In the open position the several arithmetic sectors may turn in a counterclockwise sense to permit reading of totals. As soon as one or more digits have been entered into the pin box and the latter permitted to step to the left one or more positions, follower 44a disengages from cam 45 which in response to biasing of a spring (not shown) permits the shutter 44 to close. In the closed position, shutter 44 projects into the machine to such a distance as to engage noses 1a of all arithmetic sectors 1 to the left of the first set pin column and in such position will prevent counterclockwise rotation of these latter arithmetic sectors.

Accumulator

The accumulator comprises a plurality (11 in the present embodiment) of pinions 4. In particular these are shown in FIGURES 2, 4, 5, 7, 8, 9, 21, 22 and 23. Each accumulator pinion is provided with twenty teeth and the several accumulator pinions are mounted spaced apart side by side so as to turn freely on a shaft 4b mounted in supports 71 forming a portion of an accumulator carriage. Diametrically opposed teeth 4a as more particularly seen in FIGURES 5 and 9 are wider, i.e., have wider faces than the other teeth. Within the accumulator, teeth 4a correspond to the digit 0 and the widened portion projecting beyond the normal thickness of the accumulator pinion are used to actuate tens transfer to the next higher rank.

The assembled accumulator comprising the accumulator pinions 4 on their shaft 4b is mounted on a carriage 70 as seen to best advantage in FIGURES 4, 5, 7, 8 and 9. Such carriage is formed from a pair of linear side rails 70b from which proximate one end as may be seen in FIGURES 10 and 11, depend trunnions 71. Such trunnions provide support for the shaft 4b. The accumulator carriage is arranged within the machine framework so as to have its side rails 70b received between a pair of guides 72 integrally formed on each side of the machine framework respectively. The accumulator carriage is therefore slidable in a straight line and may be slid back and forth as shown particularly in FIGURES 21, 22 and 23 by means of a crank 19 turning about a shaft 19b and having the end remote from the shaft engaging in a slot 70a of the accumulator carriage 70.

Mounted on the upper portion of the accumulator carriage is a spring member 6. Such spring member may be integrally formed as one piece, and as more particularly shown in FIGURES 8 and 12 comprises a plurality of blades arranged on the accumulator carriage so that such blades are located in the spaces between the respective accumulator pinions. Such spring members are therefore arranged so as to engage the wide teeth 4a of the accumulator pinions 4 and serve to read the passage of carries or borrows and to transmit such information to a further mechanism.

Carry storage

A plurality of identical carry storage segments are mounted to be freely rotatable about shaft 13. Such carry storage segments are mounted between the several arithmetic sectors 1. Carry storage segments comprise a toothed portion 8a, a notched portion 8b and a slotted portion 8c, the latter having centrally thereof a deeper notch detent 8d.

Figure 15:
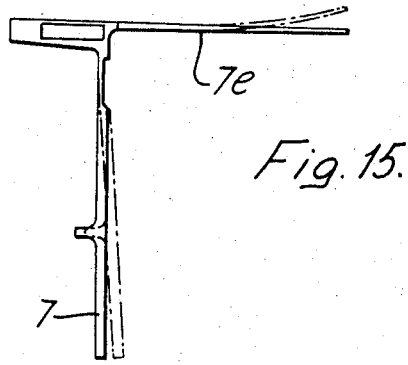
Figure 16:
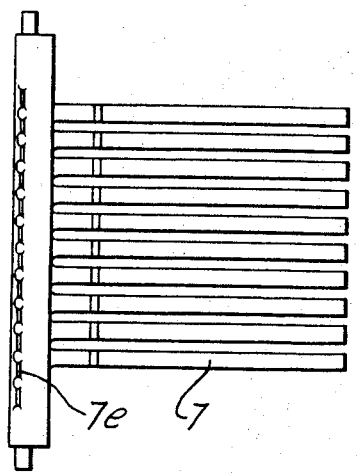

Arranged so as to engage in the notch detent portions 8d of the several carry segments are a plurality of pawls 7b depending from spring members 7. Such spring members may be integrally formed as more particularly seen in FIGURES 14, 15 and 16. The bias of the spring members 7 is such as to urge pawls 7b into the notch detent portions 8d of the individual carry segments. Springs 7b are part of an overall spring assembly 7f, which is fixed with reference to the machine framework so that the effect of springs 7 is normally to retain in place the carry segments 8.

On the ends of carry read springs 6, as will be noted on FIGURES 10, 11, 13, 21, 22 and 23, are formed upwardly projecting portions 6b. Such portions 6b are arranged to underlie the ends of springs 7. When a carry is read from the accumulator, a spring 6 correponding thereto will be raised by the passage of a tooth 4a and in turn will raise a corresponding spring 7 so that its pawl 7b is lifted out the notch detent 8d. The carry segments so affected are free to move under the urging of springs 9 engaging notches 8b.

Springs 9 likewise comprise an integrally formed spring member which may be cut in the form of a comb to provide individual spring blades, each of which engages a separate carry segment. Spring 9 is fixed to rock shaft 10 which is given an alternating motion in accordance with the program through means subsequently to be discussed.

It will be observed from FIGURES 2, 21, 22 and 23 that accumulator pinions 4 may engage either the inner rack portion 1b of arithmetic segments 1f or may engage the tooth portions 8a of the carry segments 8. Such toothed portion 8a of the carry segments are staggered one column distance as shown in FIGURES 1 and 4. Such staggering of course is to permit a carry or borrow as read from one decimal order in the accumulator to be transferred to the next higher decimal order.

Printing mechanism

A plurality of printing racks 2 are provided having teeth 2b formed on one side adapted to engage the outer teeth 1e on arithmetic sectors 1f. Such racks may have the digits 0 to 9 embossed thereon as shown at 2a in FIGURES 2, 21, 22 and 23. One such printing rack is provided for each of the arithmetic sectors and in addition as shown more particularly in FIGURE 5 will be noted a rack 85 provided for the printing of special symbols indicating "add," "subtract," "total" or "sub-total." All racks are mounted so as to be vertically movable and have their teeth in permanent engagement with the outer teeth 1e of the individual arithmetic sectors.

Figure 17:
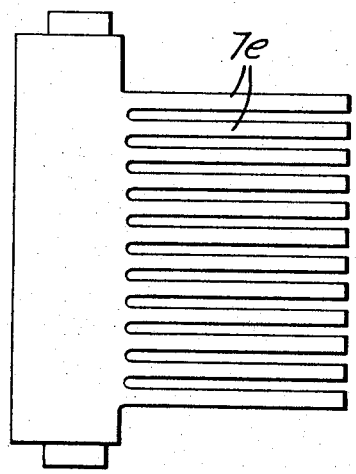

As shown in FIGURES 2, 21, 22 and 23, a plurality of print hammers 3 are provided mounted in supports 3b so as to be slidable back and forth. Such print hammers may have one end adjacent the print racks and the other end engaged by a plurality of leaf spring members 7e. These latter form part of the spring assembly 7f and again may be integrally formed as shown more particularly in FIGURES 14, 15, and 17 as cut in the form of a comb. Such springs act on the end of the print hammers so that when the latter are released springs 7e act to urge the print hammers against the print racks. The print racks are formed from a flexible material so that when a hammer strikes its corresponding print rack this is urged against an ink ribbon which contacts a strip of paper 52 fed from a paper roll 51 by paper feed mechanism 50. Platen 53 provides a back support for the paper at the printing station.

Figure 22:
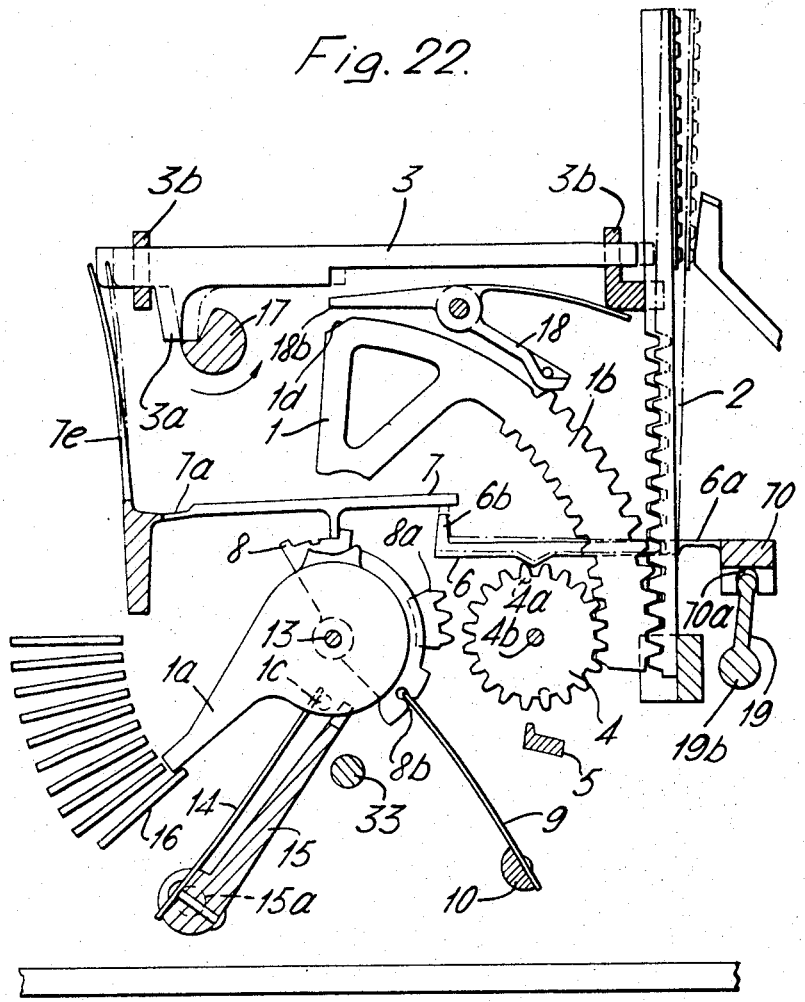
FIGURE 22 shows the same mechanism as in FIGURE 1 but following introduction of data to be subtracted.

Depending from each of the print hammers 3 and integrally formed therewith is a spur 3a. Such spur is arranged to engage a cam 17 mounted on a cam shaft 17b arranged to be driven by a turn of gears 17c from the main cam shaft 33 as shown in FIGURE 6. The profile of cam 17 includes a notch 17a. Such notch shows a sharply cut away portion so that during the clockwise rotation of cam 17 spur 3a may be quickly released thereby permitting springs 7b to urge print hammers 3 sharply to the right as seen in FIGURES 2 and 22. For each machine cycle one revolution of cam 17 takes place and it will be remarked from the profile of the notch 17a that, following a printing stroke, print hammers 3 will be withdrawn by the same cam.

In connection with each of the several print hammers will be noted a further release mechanism 18. This release mechanism serves to suppress printing of zeros beyond the most significant digits whilst enabling printing of all lower order zeros. A plurality of levers 18 are mounted so as to be freely rotatable about shaft 18c. Such levers are integrally formed with spring portions 18d bearing against print hammer support 3b and remote from the spring portions 18d project engaging portions 18b. Such engaging portions 18b are adapted to engage detents 3c in the several print hammers. Cam follower portions 18e of levers 18 are adapted to engage cam surface 1d on arithmetic segments 1. The cam follower portions 18e are each adapted to support a pin from the next adjacent lever 18 to the right as viewed for example in FIGURE 1.

Figure 21:
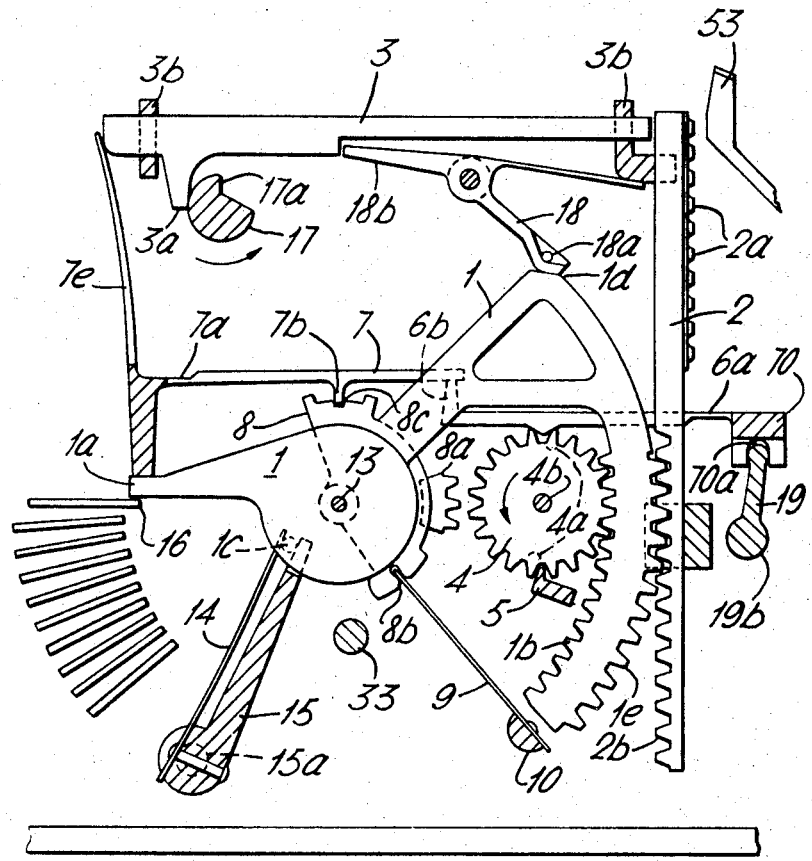
FIGURE 21 is a sectional view showing the arithmetic and print portions only for one decimal column with the accumulator cleared to zero.

It will be observed that whenever a printing rack is moved from its rest position as shown in FIGURES 1 and 21 to a print position as shown e.g. in FIGURE 22, lever 18 will be displaced upwardly thereby forcing engagement portion 18b out of engagement with the detent 3c of print hammers 3 against bias of springs 18d. Since each of the levers 18 engages the lever adjacent its right-hand side, the most significant digit to be printed will have the effect of lifting all levers to the right while leaving undisturbed those to the left by virtue of the engaging pins 18a. Thus, it is possible to suppress all zeros to the left of the most significant digit since, until the print racks are lifted at least one digit position, levers 18 for the non-significant digits will lock their respective print hammers.

*Actuating mechanisms—Total taking mechanisms*

The arithmetic sectors are actuated and restored by levers 15 in conjunction with springs 14. As in the case of most of the other spring members in the present invention, springs 14 are integrally formed as a comb member. In particular, reference is made to FIGURES 18 and 19 for details. Springs 14 formed in one piece are riveted to members 15 and as shown at 15a are arranged to be moved in an alternating sense by means of a rock shaft. The ends of members 15 and 14 project between the individual arithmetic sectors 1 and engage between them the spurs 1c provided on each of these arithmetic sectors. By rocking level members 15 to and fro the arithmetic sectors 1 will be displaced by varying distances according to the pins which have been set in the pin box 20. Because of the presence of springs 14, noses 1a may be displaced downwardly through varying distances, but in view of members 15 such nose members will be restored to abut against spring assembly 7f as shown more particularly in FIGURES 2 and 21.

In FIGURES 2, 5, 21, 22 and 23 will be observed fingers 5. These fingers are integrally formed and mounted on an axle (not shown) so as to be movable in and out of the spaces between the accumulator pinions as more particularly seen in FIGURE 5 where they may engaged the wide teeth 4a on the accumulator pinions 4. When so engaged or when in the active position as shown in FIGURES 2 and 21, fingers 5 serve to enable reading of totals or sub-totals and alternately serve to prevent cycling of the arithmetic sectors in the event that the action lever should be engaged with the accumulator and pin carriage both empty. Fingers 5 are disengaged from the accumulator during addition and subtraction operations by means of a cam 80 shown to best advantage in FIGURE 5. Such cam serves a dual purpose and on its upper surface is provided with a lower track 80b to the left and an upper track 80d to the right. Cam 80 as shown in FIGURE 5 is adapted to be slid back and forth and is urged to the left by coil spring 81. In its right-hand position as shown in FIGURE 5 track 80b will engage fingers 5 enabling the latter to block the accumulator for total taking purposes. In its left-hand position as shown in skeleton outline, the upper track 80d will engage fingers 5 thereby removing fingers 5 from engagement with the accumulator and permitting additions and subtractions to take place.

The lower cam surface of cam 80 has a stepped formation and this coacts with a spur 85a as shown in FIGURE 2 mounted on the symbol printing rack 85. When cam 80 is in the right-hand position as in FIGURE 5 rack 85 may reach its maximum outgoing position in which it will print the symbol for sub-total. Cam 80 may occupy any one of four positions and in each of these positions a different symbol will be printed.

As shown in skeleton outline on FIGURE 1 lever 60 is connected to action key 26 and will be reciprocated along its length as shown in FIGURE 1. The end of lever 60 remote from the action key is provided with a cam surface adapted to engage a slot 80c in cam 80 (FIGURE 5). The action key is in the form of a rocking lever and when rocked in one direction (add total) lever 60 will be drawn forwardly (toward the front of the machine) so that its cam portion tends to go out of the slot 80c. When the action key is rocked in the other direction (subtract, subtotal) lever 60 is urged rearwardly thus forcing its remote cam surface into the slot 80c. The effect of the latter operation urges cam 80 one step to the right against the bias of spring 81.

Lever 60 in addition to being reciprocated along its length through action key 26 may also be displaced laterally by means of a stub portion 20a depending from pin carriage 20, as more particularly shown in FIGURE 2. When the machine is in its cleared position, i.e. the pin carriage is in its extreme right-hand position, stub 20a bears against and displaces to the right lever 60. With data entered into the pin carriage and this displaced to the left stub 20a no longer bears against lever 60 and effectively this may move to the left a distance corresponding to two of the steps 80a on the cam 80. It will be observed that spring 81 through its biasing action on cam 80 serves likewise to bias the lever 61 to the left as seen in FIGURE 1. It will therefore be evident that as a result of the two operative positions of the action key 26 and as a result of the position of the pin carriage 20 cam 80 may occupy any one of four positions corresponding respectively to sub-total, total, subtract and add.

Lever 60 in addition to determining the position of cam 80 likewise determines the position of rocker 61 as shown in FIGURE 1. Rocker 61 has one end operating as a cam follower on cam 12. Cam 12 has four tracks thereon and since rocker 61 may be displaced along its supporting shaft to the right or to the left through the action of lever 60, rocker 61 may engage a corresponding cam track. Cam track 12a as shown in FIGURE 6 corresponds to a sub-total operation. Track 12b provides both total and subtract operations. Although four tracks were spoken of, actually track 12b includes the tracks for total and subtract which are identical. Track 12c is the most complex formation and provides the add function.

Rocker 61 has its end remote from cams 12 engaging a bail 19c mounted on rock shaft 19b (see FIGURES 1 and 5). It will be recalled from the preceding discussion that rocker shaft 19b is provided with a crank 19 which serves to engage the accumulator carriage so as to move this back and forth. It follows from the preceding discussion that the pattern of motions impressed on the accumulator between the inner teeth 1b of the arithmetic sectors 1 and the carry segments 8a will be determined in accordance with the program and profile established by cams 12. Cams 12 are fixed to main cam shaft 33 and with each machine cycle make one complete revolution.

Also mounted on cam shaft 33 are cams 11. In these cams, profiles are cut into the opposite faces as shown in skeleton outline on FIGURE 6. The inner profile 11a serves to engage a stud 15c as shown in FIGURE 19 thereby to rock back and forth the spring and lever assembly 15, 14 so as to read data from the pin box into the accumulator and printing racks or to read data from the accumulator into the printing racks.

The outer face profile of cam 11 is arranged to engage a follower 62 serving to rock shaft 10 back and forth as shown in FIGURES 1, 2, 21, 22 and 23. Shaft 10 carries springs 9 which, it will be recalled, serve to move those segments of the carry storage mechanism which have been released by springs 7.

A further cam and lever assembly may be provided on cam shaft 33 to actuate a ratchet mechanism so as to advance the paper following each machine cycle.

OPERATION (1) *Entry of digits into the accumulator.*—The numbers will be initially entered on the keyboard thereby setting pins in the corresponding columns of the pin carriage 20 and progressively stepping such pin carriage to the left as viewed in FIGURE 3. When the final digit has been entered the action key 26 is pushed in the add direction.

As previously explained, lever 60 will be permitted to move to its extreme left-hand position and rocker arm 61 will be positioned over cam track 12c as shown in FIGURE 6 with the other end of rocker arm 61 continuing to engage bail 19c. With depression of action key 26 an electric circuit is completed to the motor M and through a system of levers more particularly described and shown in U.S. Patent No. 3,385,519 previously referred to, a one revolution clutch mounted on main cam shaft 33 is engaged so that cam shaft 33 is permitted to make one revolution.

The profile of cam surface 12c is designed in accordance with the timing diagram (FIGURE 24) in such a manner that initially the accumulator carriage 70 is moved by means including bail 19c, rocker shaft 19b and crank 19 out of engagement with inner teeth 1b on arithmetic sectors 1. In view of the profile 80d of cam 80, total fingers 5 are disengaged from accumulator 4. Prior to completely leaving contact with teeth 1b accumulator wheels 4 will engage the teeth 8a on carry segments 8 which are presently locked in position by springs 7 and pawls 7b. In this manner accidental displacements of the accumulator pinions such as might tend to introduce errors are avoided without requiring a separate locking bar.

Following the profile of cam surface 11a stud 15c initially imparts a clockwise motion to levers 15 and springs 14 as seen in FIGURES 2 and 21, and these in turn urge arithmetic sectors 1 in a counterclockwise direction. The arithmetic sectors will be free to move under the urging of springs 14 until such time as they encounter a pin in the set position.

In view of the counterclockwise motion of arithmetic sectors 1, printing racks 2 corresponding thereto will be moved up to a position corresponding to the digit which has just been read by the nose portions 1a of segments 1. During this time cam 17 is rotating and at the proper moment in the cycle as shown in the timing diagram (FIGURE 24) the print hammers corresponding to those print racks which have been raised and all lower order print racks will be urged by springs 7e to strike the printing racks and print the digits which have been entered into the keyboard.

The timing of the return motion of arithmetic sectors 1 is likewise determined by cam track 11a, but prior to the return stroke the cam surface 12c acting through rocker arm 61 and bail 19c will return the accumulator carriage to a position where the accumulator pinions again engage the inner teeth 1b on arithmetic sectors 1. With the return stroke of arithmetic sectors 1 it is obvious that the digits will be entered into the accumulator pinions which will be displaced in a clockwise sense by the number of teeth corresponding to the digits entered in each instance.

(2) *Addition.*—Assume now that it is desired to add a number to that which is presently stored in the accumulator. The number to be added will, as previously, be entered into the keyboard and action key 26 will be pressed in the add direction. Exactly the same sequence of events takes place as previously. Assume however that carries are produced from one digit order to the next higher digit order. For the sake of example assume that the number 75 has been initially entered into the accumulator and that it is desired to add thereto the number 37. On the reading stroke the number 37 will be printed. It will be realized that through the initial data entry the first two decimal orders of the accumulator pinions will have been displaced clockwise 5 teeth and 7 teeth respectively. As the arithmetic sector corresponding to the lowest decimal order returns it will effect a further clockwise displacement of its respective accumulator pinion by 7 teeth. During such displacement, tooth 4a on this lowest order pinion will pass under spring 6 corresponding thereto thereby lifting this spring, and spring 6 through its projection 6b releases the pawl 7b on spring 7 from the detent 8d on the lowest order carry segment.

In a similar manner the next higher order accumulator pinion will have been displaced in the clockwise sense 3 teeth and will similarly release its corresponding pawl 7b so that the next higher order carry segment is likewise free.

Figure 23:
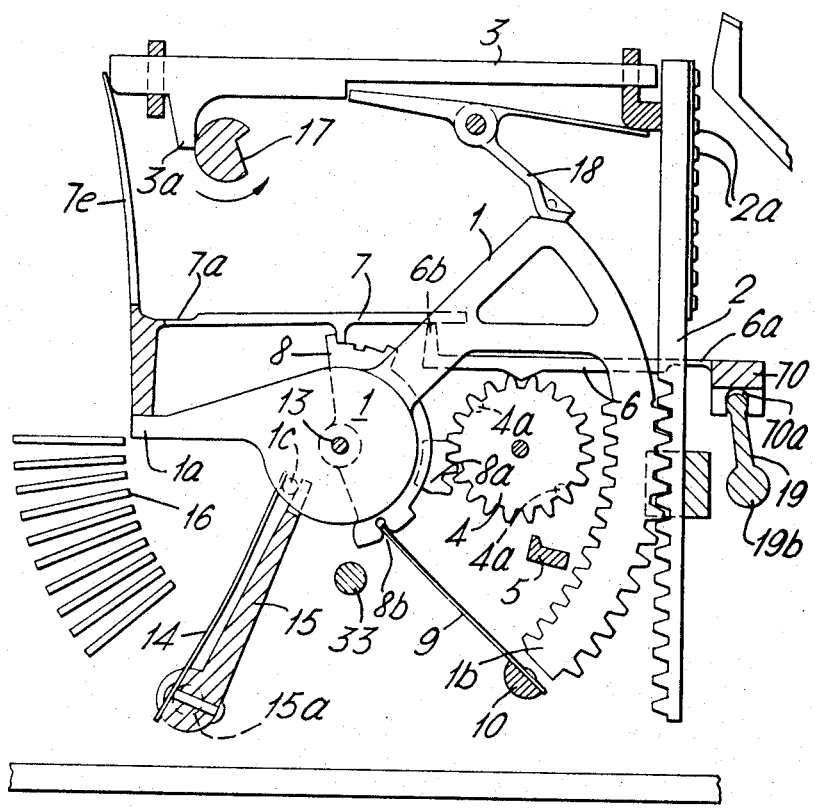
FIGURE 23 again shows the same mechanism as in FIGURES 21 and 22 and indicates the position of the various elements to effect a tens transfer during an add operation.

Rock shaft 10 will be urged at this time in accordance with the cam profile 11 so as to rock in a counterclockwise sense thereby urging the released carry segments to turn in a clockwise sense to the limit of their travel equivalent to the displacement of one tooth (see FIGURE 23).

When the digits as read by the arithmetic sectors 1 have been transferred into the accumulator pinions 4 the profile of cam track 12c is such as to move once again the accumulator carriage out of engagement with the arithmetic sectors 1 and into engagement with the carry segments 8a. Following the program of cam 11, shaft 10 now rocks springs 9 in the clockwise sense, thereby to impress a counterclockwise motion on the carry segments 8. These are permitted to move until such time as pawls 7b once again fall into detent notches 8d. During this motion the two carries which had been stored in the first two carry segments are transferred to the respective next higher accumulator pinions. Thus the initial result of adding the number 37 to the number 75 would effectively leave the accumulator registering 02. When the carries are added in, a carry will be transferred respectively into the second and third pinions giving the final result now stored in the accumulator of 112.

(3) *Subtraction.*—To effect subtraction the data is first entered into the keyboard as in the case of addition. This of course has the same effect, namely that of causing the respective pins in the pin carriage to be set and the pin carriage itself to be shifted to the left the number of columns corresponding to the number of decimal columns in the data entered.

As in the case of addition therefore it will be evident that the portion 20a depending from the pin carriage 20 will not bear against lever 60 which will accordingly be enabled to assume its leftward position as viewed from FIGURE 1. Upon depressing the action key 26 in the subtract direction lever 60 will be displaced rearwardly and the cam portion on the rearward extremity will engage the notch 80c of the cam 80 as seen in FIGURE 5, thereby displacing this cam to the right against the bias of spring 81. As previously mentioned cam 80 may occupy any one of four positions. For addition, the position occupied is that to the extreme left as shown in FIGURE 5. For subtraction cam 80 will be displaced one position to the right of that occupied for addition.

In such position rocker 61, while continuing to engage stirrup 19c, will be positioned over cam surface 12b on the left hand side as viewed in FIGURE 6.

As in the case of addition, depression of the action key 26 starts the motor and cycles the main cam shaft 33 through one revolution. Since profile 80b of cam 80 is now in use, the total taking fingers 5 will be disengaged from the accumulator 4. In view of the profile 12b of cam 12 accumulator 4 will remain engaged with arithmetic segments 1b during a first portion of the cycle as best shown by the timing diagram (FIGURE 24). It is therefore evident that the several accumulator pinions will be rotated in a counterclockwise sense, or in other words opposite to the sense in which they were rotated for an addition operation. Since the print racks 2 remain constantly engaged with outer teeth 1e and since no changes take place with reference to print release cam 17, printing of the data entered will take place as for the case of addition (see FIGURE 22). It will be observed that cam 80 is now positioned so that the second of the several steps 80a acts upon the extension 85a of the symbol printing rack 85 whereby rack 85 will print the symbol for subtract.

During this portion of the cycle any borrows which are generated by passage of teeth 4a on the accumulator pinions past the zero position will be in a similar manner transmitted to the carry storage segments 8. To this effect cam 11 is programmed so that during this first portion of the cycle, rocker shaft 10 will be rotated in a clockwise sense thereby tending to urge carry storage segments 8 in a counterclockwise sense. Those segments which have been released by passage of a carry tooth 4a will therefore be displaced by one tooth in the counterclockwise sense.

During the return stroke of the arithmetic sectors 1 cam surface 12b is profiled so as to shift accumulator carriage 70 to move pinions 4 out of mesh with sectors 1b and into mesh with segments 8a of the carry storage mechanism. At this point it will be observed that the same program on cam 11 which initially enabled storage of carries for addition will now enable transfer of the borrows stored in the segments 8 back to the accumulator. Thus rock shaft 10 now rotates in a counterclockwise sense thereby urging segments 8 in a clockwise sense until such time as the pawls 7b on carry springs 7 fall into the notch detents 8d. This clockwise rotation wherever it occurs has the effect of subtracting one from the next highest order decimal pinion in the accumulator.

To consider an example similar to that given for the addition operation let us consider that the accumulator is storing the number 132. Supposing that it is desired to subtract the number 37 from this. Initially the lowest order accumulator pinion will be displaced two teeth in the clockwise sense as seen in FIGURE 2. The adjacent higher order accumulator pinion will be displaced three teeth in the clockwise sense and the leftmost of the accumulator pinions presently in use will be displaced one tooth in the clockwise sense.

With the number 37 entered into the keyboard and the action key depressed to subtract as previously described, the first portion of the cycle will result in a rotation of the lowest order accumulator pinion by seven tooth positions and the adjacent higher order accumulator pinion by three tooth positions, both in the counterclockwise sense. It is evident that at the end of the first portion of the cycle the digits in the accumulator will stand at 105 and that a borrow will be stored in the first carry segment.

During the remaining portion of the cycle the borrow will be transmitted from the first carry segment to the second accumulator pinion, thereby causing the latter to generate another borrow. Since springs 9 are at this point urging carry segments 8 in the clockwise sense it is evident that this borrow will be transmitted to the third accumulator pinion, thereby giving a final result of 95.

The accumulator pinions will remain meshed with the carry segments 8 until such time as the return stroke of arithmetic sectors 1 has been completed at which time accumulator carriage 70 is once more returned to mesh the accumulator pinions with the arithmetic sectors.

In connection with the foregoing numerical examples, it will be realized that during both add and subtract operations a situation may arise where carries or borrows are propagated through the entire accumulator as for example where 1 is added to 9999. In these cases also it would be evident that the lowest order accumulator pinion in the case of an addition would be the only one to be affected by the arithmetic sector corresponding thereto, but that for each higher order accumulator pinion a carry would be propagated so that the result would come out as 10000. In view of the particular arrangement of springs 6, 7 and 9 it is evident that a carry or borrow may be thus propagated from each stage to the next in a staggered fashion.

(4) *Total.*—Where a total is to be taken no data will have been entered into the pin carriage via the keyboard. Accordingly, this will be at its extreme right-hand position as viewed in FIGURE 1 so that extension 20a of pin carriage 20 bears against lever 60, thereby to shift it to the right. Pressing the action key 26 to total has the effect of sliding lever 60 forwardly as seen in FIGURE 1 so that the extremity of lever 60 engaging slot 80c of cam 80 on FIGURE 5 does not affect the positioning of this cam 80. Cam 80 will therefore be in a position one step to the left of its extreme right-hand position. In this position total taking fingers 5 engage portion 80d of the cam 80 so that total taking fingers 5 are now engaged between the pinions of accumulator 4.

Rocker arm 61 will continue to engage cam surface 12b which as previously noted has double the width of the other cam surfaces forming cam 12. It will therefore be realized that the motions effected by the accumulator carriage 70 during a total taking operation are identical with those effected during a subtraction.

As in the case of an addition or subtraction the action key when operated completes a circuit to the motor M enabling one complete machine cycle to take place.

If we assume that the total 137 is stored in the machine, this indicates that the lowest order accumulator pinion will be displaced seven teeth in the clockwise sense, the next higher order accumulator pinion will be displaced three teeth and the highest order accumulator pinion which is set wil be displaced one tooth in the clockwise sense. Therefore, under urging of springs 14 the three lowest order arithmetic sectors will be enabled to be displaced upwards a distance corresponding respectively to 1, 3 and 7 teeth before the accumulator carry teeth 4a come into contact with the fingers 5 now set in a blocking position. Accordingly, the respective print racks will be raised a corresponding distance and the total will be printed. Since no carry tooth is permitted to pass the zero position there will be nothing transferred into the carry storage segments 8. Thus, during the return stroke when the accumulator pinions are disengaged from the arithmetic sector teeth 1b and engaged with the carry segments 8a no change in the contents of the accumulator will take place and it will be appreciated that this has now been cleared to zero. At the end of the stroke as in the case of subtraction, cam surface 12b will have the effect of restoring accumulator pinions into mesh with arithmetic sectors 1b.

(5) *Sub-total.*—The sub-total operation is similar in most respects to that for the total operation. It will be appreciated that for the sub-total operation rocker arm 61 will engage cam track 12a The other cams will remain much as for total with the exception of cam 80 which will be moved to its extreme right-hand position. Cam track 12a is a circle. Accordingly accumulator carriage 70 will not change its position and will retain accumulator 4 in engagement with the arithmetic sector teeth 1b throughout the entire cycle of operation. It follows that during the first part of the cycle the total contained in the accumulator is read out and printed in exactly the same manner as hereinbefore described and the accumulator is cleared. However, since the accumulator remains constantly meshed with the arithmetic sector teeth 1b, on the return stroke, exactly the same digits as were read out will now be read back in. Thus, it follows that on taking a sub-total no effective clearing of the accumulator takes place.

(6) *Multiplication.*—It will be recalled from the introductory portion of the description dealing with the keyboard that a repeat key 43 has been provided. Through use of this repeat key products may be obtained. The manner in which the repeat key operates is more completely described in the afore-mentioned U.S. Patent No. 3,385,519 previously referred to. Briefly, the repeat key, upon being depressed, acts upon shaft 37 (FIGURES 1 and 3) by means of a cam surface, to slide shaft 37 rearwardly whereby a follower normally engaging with carriage return cam 39 is prevented from so engaging. When the follower is thus disengaged the carriage will not be returned or cleared following a data entry or addition operation. Therefore such repeat key may be utilized in conjunction with the action key to obtain multiplications. The method of proceeding is as follows:

Suppose it is desired to multiply 617 by 37. Initially the number 617 is entered into the keyboard and hence into the pin carriage. The repeat key 43 is depressed and maintained depressed while the action key is held down in the add direction for seven cycles. Since the carriage is not returned or cleared this will have the effect of adding 617 to itself seven times. At the end of this operation the carriage may be stepped one column to the left by entering a zero via the keyboard. The repeat key is still held down. It will be maintained depressed for two cycles while the action key is depressed in the add direction. The repeat key is then released and the action key again depressed and maintained depressed for two additional cycles. The first of the additional cycles will add in 6170 while clearing the pin carriage. The final cycle will give the grand total which in fact is the product, namely 22829.

*General*

Although the several cam profiles are not specifically shown in the drawings, it is believed that their design will be evident to any person skilled in the art upon considering the timing diagrams as shown in FIGURE 24. FIGURE 24 serves to illustrate in graphic form the various motions which take place and which have hereinbefore been described in detail.

Although an adding and subtracting calculator has been described with a particular design, various changes may be made without departing from the nature of the invention. Thus for example, although a particular arrangement of the carry storage segments has been shown, it is clear that changes could be made in these as well as other details.

What is claimed is:

1. A calculating mechanism comprising
   (a) first means for entering and temporarily storing digital data;
   (b) accumulator means;
   (c) second means for reading data from said first means or from said accumulator means;
   (d) data carry over storage means;
   (e) cycling means capable, in accordance with a predetermined program, of linearly displacing said accumulator means from engagement with said second means to engagement with said data carry over storage means and of actuating said second means and said data carry over storage means;
   (f) leaf spring means capable of reading data carry overs from said accumulator and means for transmitting said data carry overs to said data carry over storage means; and
   (g) data read out means actuated directly from said second means.

2. A calculating mechanism comprising
   (a) keyboard means and pin box means actuated from said keyboard means so as to effect setting of data pins in said pin box means corresponding to the digital data entered from said keyboard and to effect progressive escapement of said pin box means with each item of data entered;
   (b) a plurality of data read and transfer sectors mounted so as to be individually displaceable into contact with set pins in said pin box means thereby to read data temporarily stored in said pin box means;
   (c) first and second rack means integrally formed with each data read and transfer sector;
   (d) a plurality of carry over storage segments each provided with third rack means and mounted movable into engagement with said data read and transfer sectors;
   (e) an accumulator comprising a plurality of pinions mounted side by side so as to be individually freely rotatable, the entire accumulator being linearly displaceable between first and second positions, whereby said pinions may alternately engage said first rack means and said third rack means, said pinions being each provided with carry over indicating means;
   (f) power means and a camshaft driven thereby, said camshaft carrying a plurality of cams;
   (g) first leaf spring means displaceable by a first one of said cams capable of imparting individual displacement to said data read and transfer sectors;
   (h) second leaf spring means displaceable by a second one of said cams capable of imparting individual displacements to said carry over storage segments;
   (j) third leaf spring means adjacent said accumulator and adapted to sense said carry over indicating means;
   (k) fourth leaf spring means provided with pawl means, said fourth leaf spring means engaging said third leaf spring means and said pawl means engageable with said carry over storage segments whereby carry overs may be transferred from said accumulator to said carry over storage segments;
   (l) cam means driven by said camshaft, capable of imparting a variable pattern of motions to said accumulator between said first and second positions; and
   (m) a plurality of data read out rack means engaged with said second rack means whereby data entered from the keyboard or stored in the accumulator may be read out.

3. A calculating mechanism according to claim 2 wherein said first, second, third and fourth leaf spring means individually are integrally formed as a comb thereby to provide on each a plurality of individual spring fingers.

4. A calculating mechanism according to claim 2 wherein said data read out rack means are adapted to print data further comprising
   (a) a printing station and print receiving means;
   (b) a plurality of print hammers each capable of engaging a corresponding data read out rack means to urge the latter into contact with said print receiving means;
   (c) fifth leaf spring means contacting said print hammers so as to urge said print hammers individually into contact with said data read out rack means; and
   (d) cam means driven from said camshaft and adapted to release said print hammers at a predetermined time to enable printing and to restore subsequently said print hammers against the bias of said fifth leaf spring means.

5. A calculating machine according to claim 4 wherein said fifth leaf spring means is integrally formed as a comb thereby to provide a plurality of individual spring fingers.

6. A calculating machine according to claim 4 further comprising
   (a) a plurality of print hammer latching means each provided with a print hammer latching member, a spring member and a cam follower portion;
   (b) a cam surface on each data read and transfer sector, said cam surfaces adapted to engage said cam follower portions; and
   (c) an interlock member extending from each print hammer latching means to an adjacent print hammer latching means whereby significant digits only are printed.

7. A calculating mechanism according to claim 2 further comprising
   (a) a shutter latch member mounted beside and carried by said pin box means so as to effect progressive escapement therewith, said shutter latch member being capable of swinging from a first position to a second position;
   (b) a cam surface adapted to engage said shutter latch member so as to force it into said second position when said pin box means is in a cleared state and to release said shutter latch member to said first position following data entries and escapement of said pin box means and shutter latch member, said shutter latch member in its first position serving to block displacement of all data read and transfer sectors beyond the data pin set to record the most significant entered data digit.

8. A calculating mechanism according to claim 2 wherein said carry over indicating means comprises at least one tooth on each accumulator pinion having a widened face so as to project beyond the normal thickness of said accumulator pinions.

9. A calculating mechanism according to claim 2 further comprising
(a) an assembly comprising a plurality of fingers;
(b) means for displacing said assembly between first and second positions wherein said first position enables said fingers to block passage of said carry over indicating means on the accumulator pinions and said second position permits passage of said carry over indicating means; and
(c) means actuable from said keyboard means for operating said displacing means so that in said first position data stored in said accumulator is transferred to said data read out rack means and in said second position data may be entered and arithmetically manipulated in said accumulator.

10. In a calculating mechanism including data entry means, accumulator means, data read and transfer means, carry over storage means, data output means, and actuating means the improvement comprising
(a) a first comblike leaf spring member displaceable by said actuating means to operate said data read and transfer means;
(b) a second comblike leaf spring member displaceable by said actuating means to operate said carry over storage means;
(c) a third comblike leaf spring member adapted to sense data carry overs in said accumulator means;
(d) a fourth comblike leaf spring member displaceable by said third comblike leaf spring member to enable transfer of data carry overs from said accumulator means to said carry over storage means; and
(e) a fifth comblike leaf spring member acting upon said data output means whereby data output may be obtained in printed form.

11. In a calculating mechanism according to claim 10, the improvement wherein each of said first, second and third leaf spring members is integrally formed as a comb and wherein said fourth and fifth leaf spring members are together integrally formed as separate combs so as to provide on each leaf spring member a plurality of individual spring fingers.

12. In a calculating mechanism the combination comprising
(a) an accumulator formed from a plurality of individually rotatable pinions mounted spaced apart side by side, each pinion being provided with at least one widened tooth serving as an index and carry over indicator;
(b) a carry-over memory formed from a plurality of individually rotatable segments mounted side by side, with each segment having a detent notch portion aligned with the carry over indicator in a correspondingly ordered accumulator pinion and a staggered rack portion aligned with the teeth in the next higher ordered accumulator pinion;
(c) a first plurality of spring fingers mounted adjacent said accumulator in the spaces between said pinions thereby to sense the passage of said index and carry over indicator;
(d) a second plurality of spring fingers mounted adjacent said carry over memory, each of the second spring fingers having a pawl thereon biased to engage said detent notch portions in the carry over memory segments, said second plurality of spring fingers being engaged by said first plurality of spring fingers so as to disengage the pawls from the detent notches of those carry over memory segments corresponding to accumulator pinions which rotate past an index point;
(e) means for introducing numerical data into said accumulator thereby rotating said pinions for each rank by the number of teeth corresponding to the digit in the respective column of the data so introduced;
(f) programmed actuating means capable of individually imparting rotations to the carry over memory segments together in a first or second position sense, in accordance with a desired arithmetic operation; and
(g) programmed displacement means for shifting the accumulator pinions into and out of mesh with the rack portions of the carry over memory segments in accordance with a desired arithmetic operation so that carries or borrows generated by operations with the accumulator may be temporarily stored in the carry over memory and eventually returned to the accumulator.

13. In a calculating mechanism according to claim 12, the improvement wherein said means for introducing data includes a plurality of racks capable of meshing with the accumulator pinions, said accumulator being linearly displaceable between said means for introducing data and the carry over memory segment racks, the distance of displacement being such that said pinions engage said carry over memory segment racks before completely disengaging the data introducing racks and vice-versa thereby to eliminate the necessity for separate accumulator locking means.

14. In a calculating mechanism according to claim 12 the improvement wherein said programmed actuating means includes a plurality of spring fingers adapted to engage the carrying over memory segments said spring fingers being mounted on a rocker shaft thereby to impart separately a rocking motion to each of said carry over memory segments.

15. A calculating mechanism according to claim 12 and further comprising
(a) a plurality of fingers adapted to be moved in and out of the spaces between the accumulator pinions thereby to block or free the rotation of said pinions past an index point;
(b) a first plurality of racks adapted to mesh with said pinions;
(c) means for individually urging said first plurality of racks to rotate their corresponding pinions to the blocked position of said pinions when said plurality of fingers is in its blocking position; and
(d) a second plurality of racks adapted to be shifted by the first plurality of racks a distance corresponding to the rotational displacement of each pinion before reaching the blocked position, whereby the contents of the accumulator are read out.

16. A calculating mechanism according to claim 15 wherein the urging means for said first racks comprises a plurality of spring fingers rotatable as an assembly by a programmed rocker shaft.

References Cited

UNITED STATES PATENTS

| | | | |
|---|---|---|---|
| 1,247,670 | 11/1917 | Greve | 235—60.28 |
| 1,889,023 | 11/1932 | Luttropp | 235—60.31 |
| 2,667,304 | 1/1954 | Wallach et al. | 235—60.31 |
| 3,221,644 | 12/1965 | Gelling | 235—60.28 |

RICHARD B. WILKINSON, *Primary Examiner.*

S. A. WAL, *Assistant Examiner.*

U.S. Cl. X.R.

235—58, 60.28